June 24, 1947.  G. F. TAYLOR  2,422,994

TWIST DRILL

Filed Jan. 3, 1944

Inventor:
George F. Taylor,
by Harry E. Dunham
His Attorney.

Patented June 24, 1947

2,422,994

UNITED STATES PATENT OFFICE 2,422,994

TWIST DRILL

George F. Taylor, Grosse Pointe Woods, Mich., assignor to Carboloy Company, Inc., Detroit, Mich., a corporation of New York Application January 3, 1944, Serial No. 516,796

3 Claims. (Cl. 77—68)

The present invention is a sintered twist drill and more particularly a twist drill adapted for deep metal drilling. Prior to the present invention deep metal drilling generally has been effected by single fluted drills which have a straight longitudinally extending V-shaped flute, the axis of the V being substantially, but not exactly, at the center of the drill. Lubricant or coolant is supplied to the active end of such drills through a hole which extends through the drill parallel to the flute. The hole generally is positioned directly in the rear of the apex of the V-shaped flute and at approximately equal distances from the outer end portions of the V. In order to supply the proper amount of coolant to the active end of the drill a relatively large opening is required which effects a considerable reduction in the strength of the drill.

It is one of the objects of the present invention to provide an extruded and sintered drill suitable for use in deep metal drilling. It is a further object of the invention to provide an extruded and sintered twist drill with spiral holes extending therethrough whereby a coolant such as oil or compressed air may be supplied to the active end of the drill. It is a further object of the invention to provide a sintered twist drill in which spiral holes extending through the drill may have any desired shape. A further object of the invention is to provide a simple and efficient process for fabricating twist drills having spiral holes extending therethrough.

Figure 1:
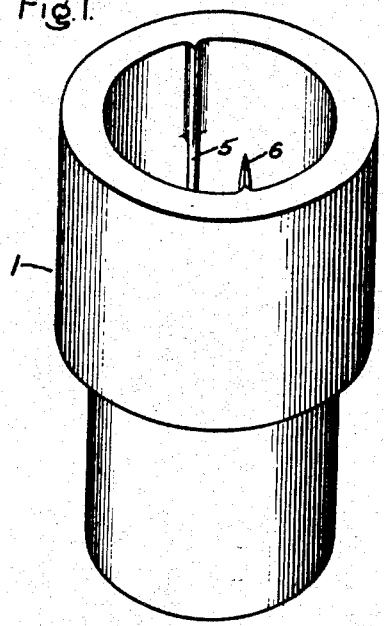
Figure 2:
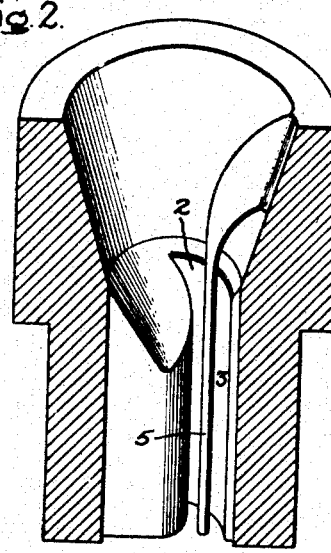
Figure 3:
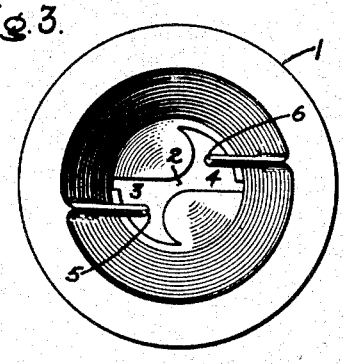
Figure 4:
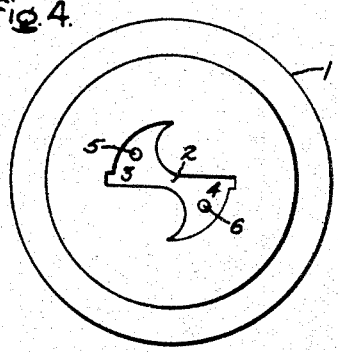
Figure 5:
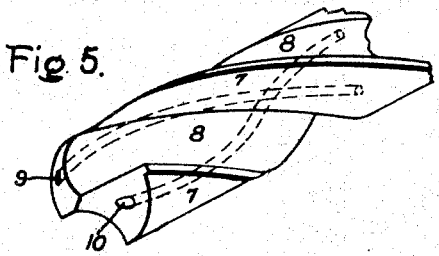

The novel features which are characteristic of my invention are set forth with particularity in the appended claims. My invention itself however will best be understood from reference to the following specification when considered in connection with the accompanying drawing in which Fig. 1 is a perspective view of an extrusion die employed in the fabrication of my improved twist drill; Fig. 2 is a vertical cross section in perspective through the center of the die; Fig. 3 is a plan view of the die illustrated in Figs. 1 and 2; Fig. 4 is a plan view of the exit or end portion of the die; while Fig. 5 is a perspective view of an improved twist drill broken away and provided with spiral holes extending through each of the drill lands.

Referring more particularly to the drawing, I have indicated at 1 an extrusion die which is provided with a smooth straight passage or bearing 2 extending therethrough and comprising two substantially symmetrical oppositely disposed, triangular portions 3 and 4 which are adapted to permit formation, in the extruded material, of the usual flutes and lands in a twist drill. Metal pins or mandrels 5 and 6 extend respectively through the portions 3 and 4 of the passage or bearing 2. The pins may be secured in position by brazing the upper end portions of the pins to the body of the die or by any other suitable means. While pins 5 and 6 are illustrated as circular in cross section other shaped pins, for example pins which are elliptical or triangular in cross section, may be employed if desired.

In making a drill in accordance with the present invention powdered material in the form of a paste is prepared as set forth in my prior Patent 2,271,960, or in any other suitable manner, and the pasty or plastic material forced through the die 1. As the extruded material emerges from the die the die may be rotated while the end of the extruded material is held against rotation. If desired, however, the die may be held rigidly in position while the extruded material is rotated to form the desired shape of drill. The pins or mandrels 5 and 6 provide a pair of oppositely disposed straight holes which extend through the extruded material and these holes are given a spiral shape when the extruded material is twisted into the form of a twist drill.

The extruded material may be cut into desired lengths and partially sintered to permit shaping of the lower end of the drill. Thereafter it is sintered at a higher temperature to form a hard dense twist drill having the usual lands 7 and flutes 8 as illustrated in Fig. 5. The lower ends of the spiral holes through the drill are indicated at 9 and 10 in Fig. 5. The holes in the drill permit a coolant such as water, oil, compressed air, or the like to be supplied to the active end of the drill. The coolant prevents excessive temperature rise at that point and also washes out chips formed during the drilling operation.

If desired the plastic material extruded through the die 1 may be in the form of an untwisted fluted rod and may be sintered in that shape at an elevated temperature into a hard, dense mass. Thereafter the sintered rod may be reheated at about 1300° C. and twisted into a twist drill having any desired pitch.

One of the particular advantages of the extruded twist drill is that the holes extending through it can be placed in any desired position so as to provide improved rigidity in the drill. Also, one or more holes having various shapes and sizes may be employed if desired.

What I claim as new and desire to secure by Letters Patent of the United States, is:

1. An extruded and sintered cemented carbide twist drill adapted for deep metal drilling, said drill having a longitudinally extending spiral hole positioned entirely within one of the drill lands.

2. An extruded and sintered cemented carbide twist drill adapted for deep metal drilling, said drill having a longitudinally extending spiral hole positioned entirely within each drill land and extending from end to end of said drill whereby a lubricant or coolant may be supplied to the active end of the drill.

3. An extrusion die, the bearing surface of said die consisting of two connected, oppositely disposed, triangular-shaped openings adapted to permit formation in the extruded material of the usual flutes and lands in a twist drill, at least one of said openings being provided with a mandrel rigidly secured to the entrance end of the die and extending through said opening.

GEORGE F. TAYLOR.

REFERENCES CITED

The following references are of record in the file of this patent:

UNITED STATES PATENTS

| Number | Name | Date |
|---|---|---|
| 2,271,960 | Taylor | Feb. 3, 1942 |
| 589,576 | Rickey | Sept. 7, 1897 |
| 1,208,164 | Kelly | Dec. 12, 1916 |
| 1,738,665 | Ober | Dec. 10, 1929 |
| 1,814,820 | Boswell | July 14, 1931 |
| 2,171,095 | Orsini | Aug. 29, 1939 |
| 2,289,787 | Kaschke et al. | July 14, 1942 |
| 2,164,397 | Ganoe | July 4, 1939 |
| 2,148,805 | Cogsdill | Feb. 28, 1939 |

FOREIGN PATENTS

| Number | Country | Date |
|---|---|---|
| 12,139 | Great Britain | May 16, 1914 |